(12) United States Patent
Daniel

(10) Patent No.: US 11,952,920 B2
(45) Date of Patent: Apr. 9, 2024

(54) ENERGY RECOVERY SYSTEM AND METHODS OF USE

(71) Applicant: Guy James Daniel, Katy, TX (US)

(72) Inventor: Guy James Daniel, Katy, TX (US)

( * ) Notice: Subject to any disclaimer, the term of this patent is extended or adjusted under 35 U.S.C. 154(b) by 70 days.

(21) Appl. No.: 17/371,053

(22) Filed: Jul. 8, 2021

(65) Prior Publication Data

US 2023/0009903 A1     Jan. 12, 2023

(51) Int. Cl.
*F01K 23/00*  (2006.01)
*F01K 3/18*  (2006.01)
*H02K 7/18*  (2006.01)

(52) U.S. Cl.
CPC ............. *F01K 23/00* (2013.01); *F01K 3/186* (2013.01); *H02K 7/1823* (2013.01)

(58) Field of Classification Search
CPC ........ F01K 3/186; F01K 23/00; H02K 7/1823
See application file for complete search history.

(56) References Cited

U.S. PATENT DOCUMENTS

| | | | |
|---|---|---|---|
| 2,933,885 A * | 4/1960 | Vago | F01K 3/00 126/646 |
| 3,716,099 A * | 2/1973 | Deschamps et al. | F02C 1/105 165/135 |
| 5,944,089 A * | 8/1999 | Roland | F28D 1/0475 165/145 |
| 8,955,320 B2 | 2/2015 | Xiang et al. | |
| 10,012,113 B2 * | 7/2018 | Vamvas | F28D 20/02 |
| 2003/0155111 A1 * | 8/2003 | Vinegar | E21B 43/2408 166/59 |
| 2004/0099261 A1 * | 5/2004 | Litwin | F24S 20/20 126/638 |

(Continued)

OTHER PUBLICATIONS

"huadesoong", "Distributed Molten Salt Heat Storage," https://www.climatecolab.org/contests/2017/energy-supply/c/proposal/1334126 (Year: 2017).*

(Continued)

*Primary Examiner* — Tulsidas C Patel
*Assistant Examiner* — Thomas K Quigley
(74) *Attorney, Agent, or Firm* — Phillip Black; Dossey & Jones PLLC

(57) ABSTRACT

A system and method are provided for storing and recovering electricity generated from conventional/renewable energy sources. A thermal energy storage vessel contains thermal storage fluid ("TSF") comprising a eutectic ternary nitrate molten salt, induction heating elements, turbine pumps, a heat exchanger, and various data acquisition sensors like thermocouples and thermistors. The immersion heating elements receive the electricity generated from conventional and/or renewable energy source to heat the eutectic ternary nitrate molten salt to the desired temperature. Coiled tubing is deployed within the thermal containment vessel to be distribution systems for the power cycle working gas and heat exchange for the power cycle working gas. The power cycle working gas is delivered under pressure to a steam turbine. The turbine converts the energy into mechanical shaft work to drive an electricity generator to produce electricity. The steam exhaust is gathered by a compressor and returned to the thermal energy storage vessel.

20 Claims, 15 Drawing Sheets

(56) References Cited

U.S. PATENT DOCUMENTS

| | | | | |
|---|---|---|---|---|
| 2004/0244376 | A1* | 12/2004 | Litwin | F03G 6/064 60/641.8 |
| 2008/0128134 | A1* | 6/2008 | Mudunuri | E21B 36/04 166/302 |
| 2008/0131830 | A1* | 6/2008 | Nix | F24S 10/45 432/220 |
| 2008/0276616 | A1* | 11/2008 | Flynn | F28D 20/021 126/400 |
| 2008/0289793 | A1* | 11/2008 | Geiken | F24S 80/20 165/10 |
| 2010/0175689 | A1* | 7/2010 | Zillmer | F24S 60/30 126/609 |
| 2010/0314081 | A1* | 12/2010 | Reis | F28F 21/02 165/134.1 |
| 2011/0017196 | A1 | 1/2011 | Bell et al. | |
| 2011/0219771 | A1* | 9/2011 | Stiesdal | F28D 20/021 60/670 |
| 2011/0313218 | A1* | 12/2011 | Dana | C10B 53/06 208/400 |
| 2012/0319410 | A1* | 12/2012 | Ambrosek | F02C 6/10 290/1 R |
| 2013/0056169 | A1* | 3/2013 | Stiesdal | F28D 20/021 165/10 |
| 2014/0053554 | A1* | 2/2014 | Tartibi | F01K 3/186 60/643 |
| 2014/0060046 | A1* | 3/2014 | Takahashi | F28D 20/023 126/618 |
| 2014/0366536 | A1* | 12/2014 | Muren | F03G 6/00 126/618 |
| 2015/0143806 | A1* | 5/2015 | Friesth | F01K 13/02 220/592.2 |
| 2015/0167648 | A1* | 6/2015 | Bergan | F24S 23/00 60/641.15 |
| 2015/0171455 | A1* | 6/2015 | Mills | H01M 8/144 429/422 |
| 2015/0267566 | A1* | 9/2015 | Vamvas | F28D 20/02 60/659 |
| 2016/0047212 | A1* | 2/2016 | Vinegar | F24H 1/0018 166/57 |
| 2016/0115945 | A1 | 4/2016 | Barsi et al. | |
| 2016/0320145 | A1* | 11/2016 | Bergan | B23P 15/26 |
| 2017/0141724 | A1* | 5/2017 | O'Donnell | F24T 10/15 |
| 2017/0363368 | A1* | 12/2017 | Bergan | F28D 20/0056 |
| 2019/0153284 | A1* | 5/2019 | Meroueh | F03G 6/068 |
| 2020/0132393 | A1* | 4/2020 | Phillips | F28F 21/04 |
| 2020/0385287 | A1* | 12/2020 | Cen | B01D 3/06 |
| 2022/0307386 | A1* | 9/2022 | Savic | F01D 25/00 |
| 2022/0373269 | A1* | 11/2022 | Sherman | F28D 20/0043 |

OTHER PUBLICATIONS

Darren Soong, "Distributed Molten Salt Heat Storage—Description", https://www.climatecolab.org/contests/2017/energy-supply/c/proposal/1334126 (Year: 2017).*

Darren Soong, "Distributed Molten Salt Heat Storage—Comments", https://www.climatecolab.org/contests/2017/energy-supply/c/proposal/1334126 (Year: 2017).*

* cited by examiner

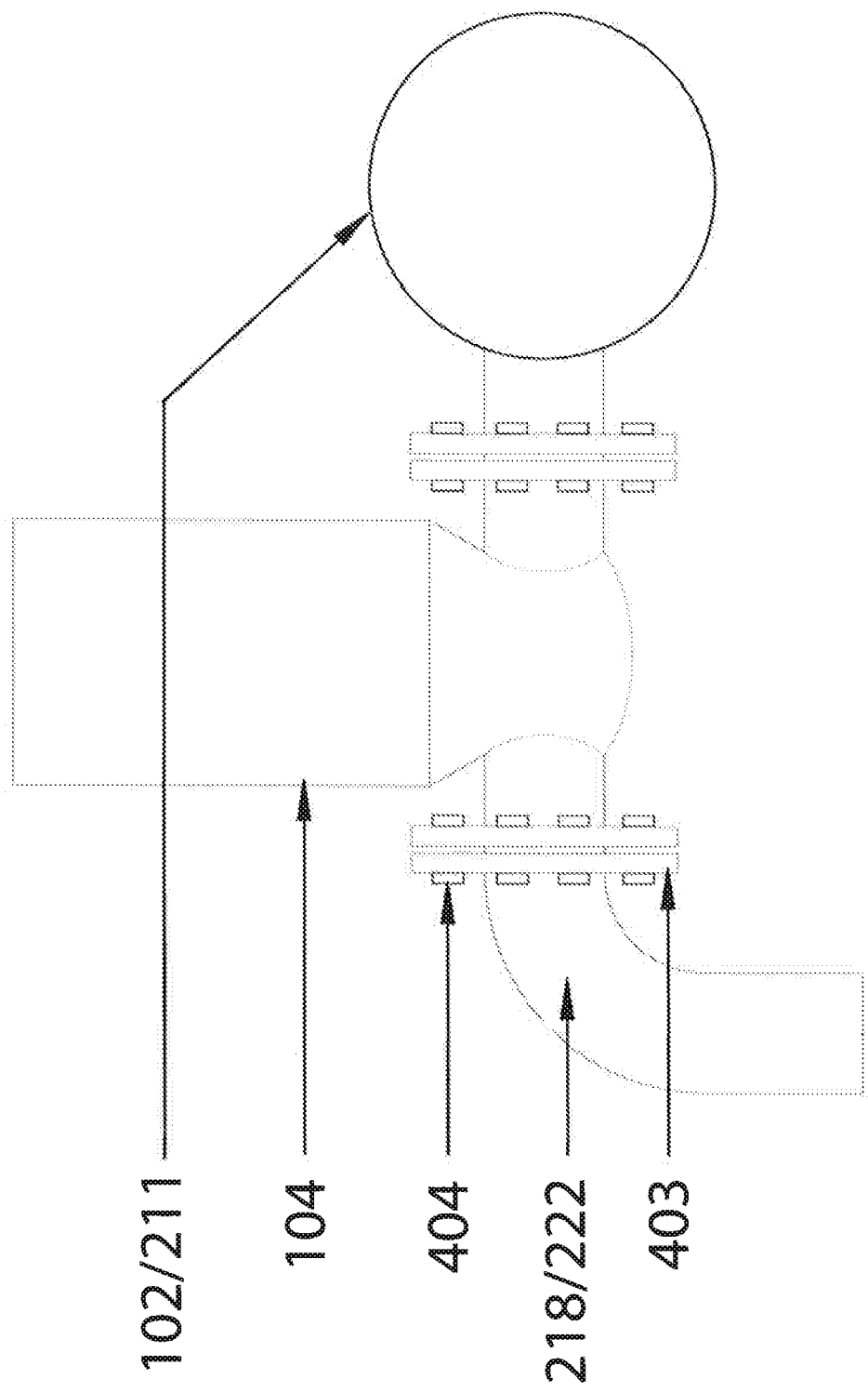

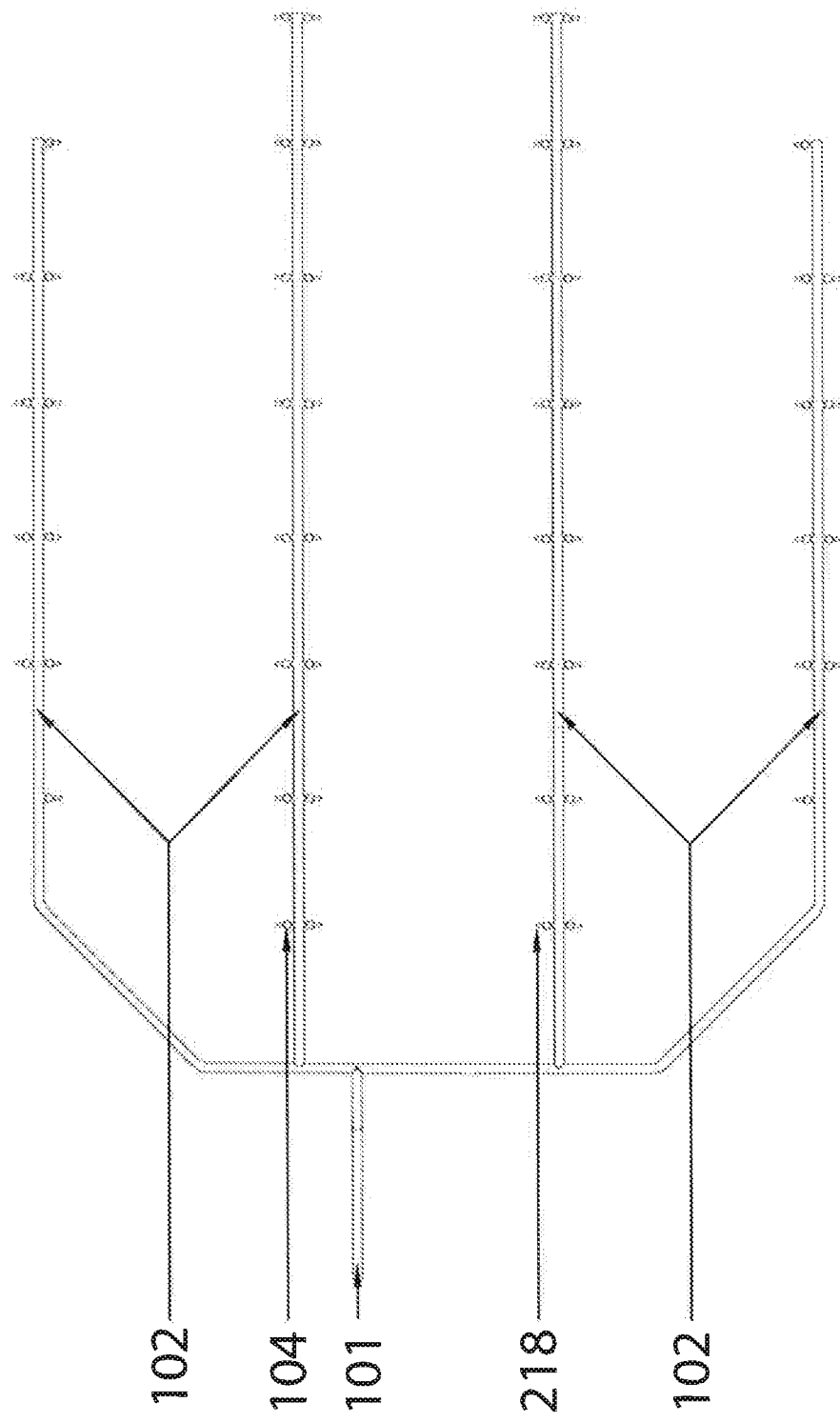

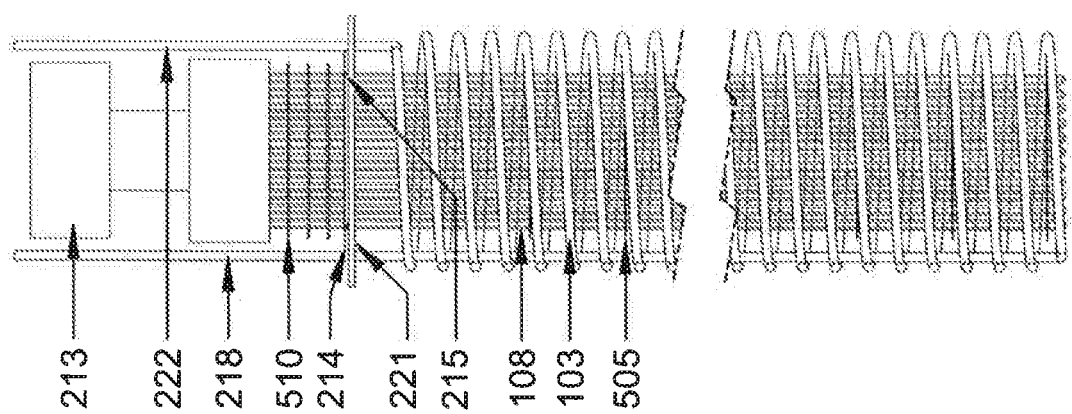

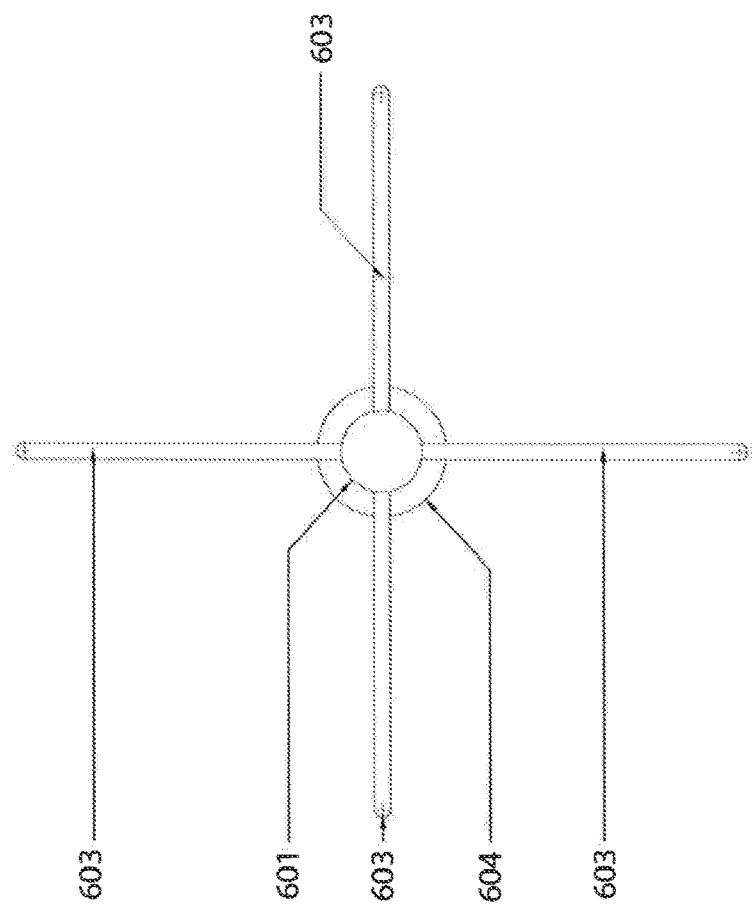
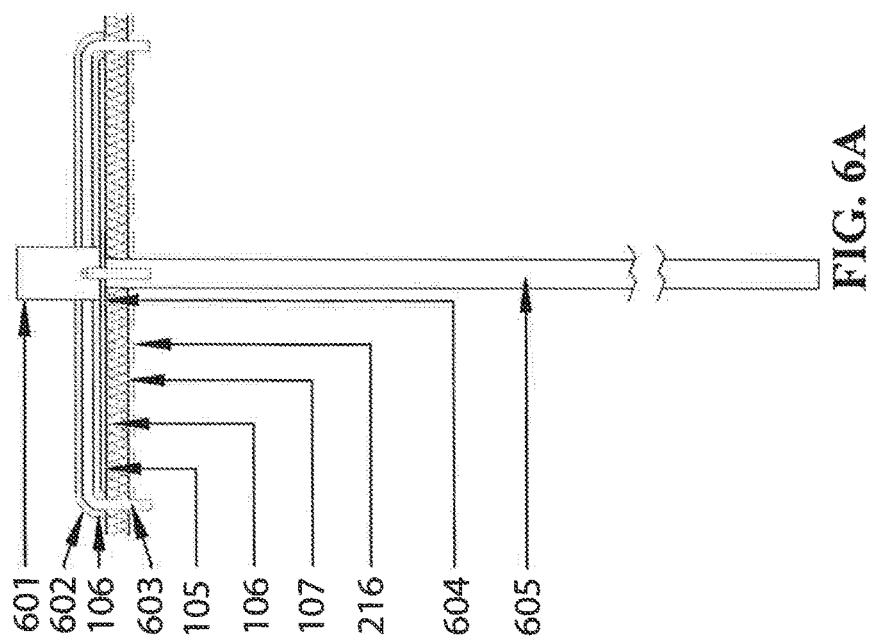
FIG. 6B
FIG. 6A

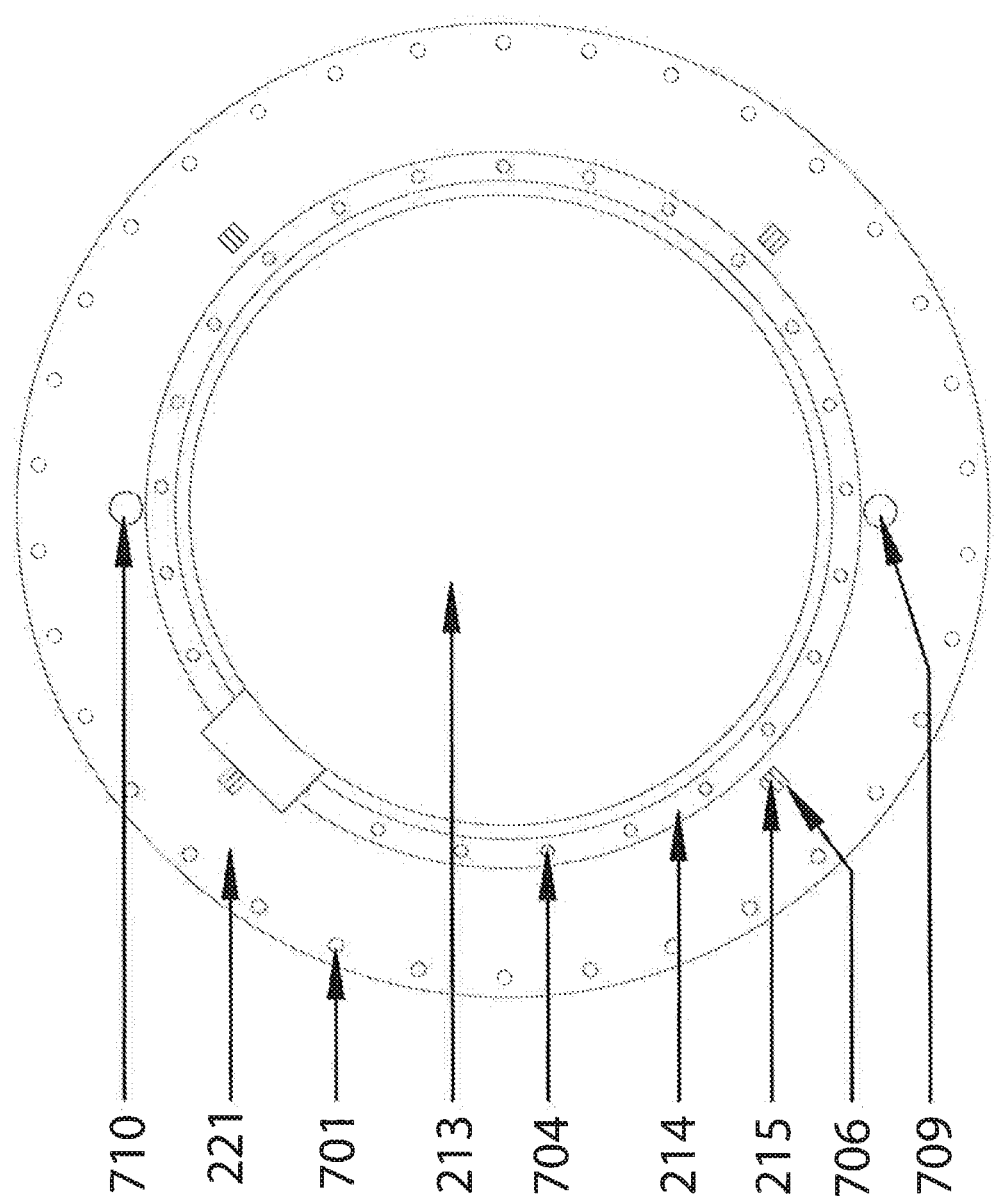

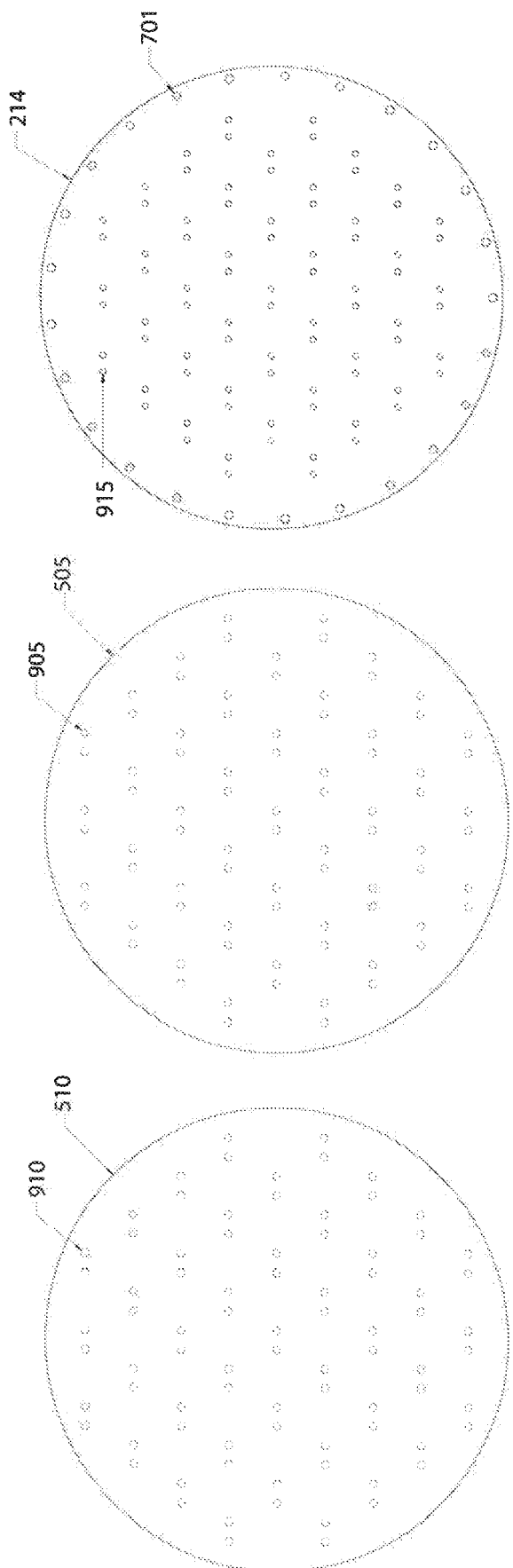

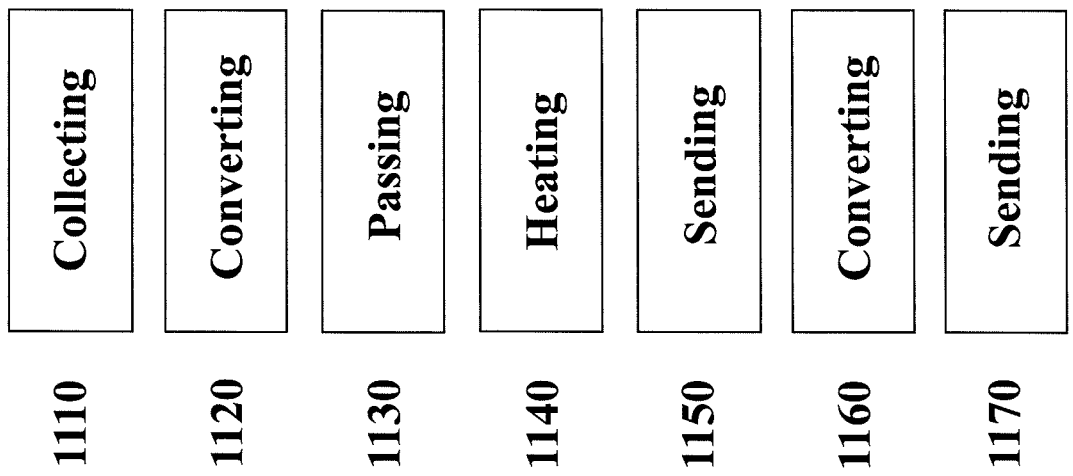

ENERGY RECOVERY SYSTEM AND METHODS OF USE

FIELD OF THE INVENTION

The disclosure relates generally to energy recovery systems, and more specifically to thermal energy systems for storing and recovering electricity generated from conventional and/or renewable energy sources.

BACKGROUND OF THE INVENTION

Power output from renewable energy sources is dependent on a variety of factors that can affect the power output from these natural resources. Renewable energy sources, with the current state of technology, are not able to supply base load power generation and are considered non-dispatchable generation sources. Although, during optimal conditions, renewable energy sources can produce large amount of energy. Due to the intermittent nature of renewable power sources, management difficulties for grid operators are created.

In response to the intermittent nature of renewable power sources, energy storage systems are provided to the renewable power sources in order to capture the energy. Energy storage technologies are of the utmost importance for balancing supply and demand of electricity generation, distribution, and usage. Lithium-Ion Batteries ("LIB") are typically utilized for direct electric energy storage in such applications as conventional, photovoltaic and wind power plants. The high intrinsic cost of Lithium-ion batteries, generally, makes the technology cost-prohibitive as an energy storage system. These high costs are attributed to the vulnerabilities in the supply-chain such as high market demands for lithium and cobalt ores, geographical location, ground & marine logistics, geopolitical risk, adverse environmental, social, and economic impacts which are all well documented.

Thermal energy storage ("TES") is extremely cost effective and is intrinsically low cost, due to the availability of inexpensive materials for thermal storage fluid ("TSF") and heat transfer fluid ("HTF"), scalability (small to grid-level), long life and environmental friendliness of TES. Molten salt ("MS"), an important component of TES, has been used in different industrial applications for about 610 years to date. In addition, nitrate salts have been used for decades in the concentrating solar power industry as latent thermal storage and as an HTF. The main factor affecting the performance of a TES system is the thermal stability of the materials used to store the heat. Currently, eutectic ternary molten salts are the most utilized materials for TES at high temperatures due to several physical properties that they exhibit.

The performances of TES systems, connected to the energy production, rely heavily on the maximum optimization of the thermodynamic properties of eutectic ternary molten salts which typically have a substantially higher specific gravity than other less desirable heat transfer fluids. Molten salts are a great and effective way to store energy for future use due to the vast heat storage capacities and their ability to store heat for long periods of time. The aspects of molten salts that must be considered are the physical properties, including melting point, density, viscosity, surface tension, buoyancy, explosiveness, flammability, toxicity of vapors, heat capacity, and electrical conductance.

Nitrate Molten Salts are inorganic, nonaqueous media, an eutectic ternary mixture comprising $NaNO_3$, $Ca(NO_3)_2$ and $KNO_3$ used as a low-cost and thermal energy storage in power plants which improves the dispatchability and marketability of the produced electrical power. Nitrate Molten Salt Energy Storage Systems do not have any of the adverse environmental issues associated with lithium-ion batteries, such as water use and $CO_2$ emissions, social issues associated with the mining of rare metals, disposal or recycling of the batteries or the operational challenges as associated with the LIBs. Nitrate Molten Salts are suitable thermal storage fluid, with a liquid phase temperature range from about 131 to 630 degrees Celsius (° C.) and decomposition commencing above 630° C. Molten salts are non-flammable, non-explosive and evolve no toxic vapors under recommended conditions of use, and therefore are strong proven candidates for HTFs and thermal storage fluids ("TSFs"). The specific heat capacity of eutectic ternary molten salts ranges from 1.18 to 1.9 kJ/kg·K with an average thermal conductivity range from 0.38 to 0.88 W/mK and a density ranging from 1.3 to 1.96 $g/cm^3$. Nitrate molten salts are desired because these types of fluids enhance the overall efficiency of the plants by utilizing less energy to keep the salt in the liquid state and by producing superheated steam at higher temperatures in the Steam Rankine Cycle to drive large scale steam turbines for electrical power generation.

The three most common forms of concentrated solar power ("CSP") are (i) the trough system that uses mirrored parabolic troughs or linear Fresnel mirror system, (ii) the central receiver systems or solar power tower ("SPT") combined that uses heliostat fields, and (iii) the dish system, which uses dish-shaped parabolic mirrors. In a CSP plant during the day, sun radiation energy is captured in a concentrated way by means of mirrors. The concentrated sun radiation energy is typically used, either directly or indirectly, to heat a HTF, usually a mass of molten salts comprised mostly of a mixture of nitrates. The TES system stores molten salts in paired tanks ("hot" and "cold" storage tanks). Alternatively, in a "thermocline" storage tank system, the "hot" and "cold" molten salt is stored in a single-tank system. The thermocline storage tank system is an economical alternative to the two-tank Storage system.

TES systems typically consist of three thermal fluids: (i) the thermal storage fluid, (ii) the heat transfer fluid, and (iii) the power cycle working fluid/gas. Energy from conventional and renewable utility power generation is stored in a thermal storage fluid, typically a molten salt fluid. The HTFs are pumped through a closed loop that originates from the TES tank, pumped to the heat collector/energy source, and then pumped back to the TES. HTFs transfer the heat from an energy source to thermally heat a thermal fluid for storage (is later discharged back to the TES), or to directly heat a power cycle working liquid through a heat exchanger. The power cycle working gas receives the heat from the heat exchanger and drives a Rankine Cycle or Brayton Cycle turbine to generate electric power. Heat transfer fluids are typically either a gas or a liquid. The liquid HTFs are molten salts and heat conducting oil. The gas HTFs are superheated/supercritical steam and supercritical $CO_2$. HTFs are pumped from the TES to a heat exchanger and pumped back to the TES.

The Rankine Cycle or the Brayton Cycle is a thermodynamic cycle that primarily transfers force, motion, or mechanical energy. The heat is supplied via a closed loop by a power cycle working gas under high temperatures and under intense pressure. The power cycle working gas is either a liquid or a gas. The power cycle working gases are superheated/supercritical steam and supercritical carbon dioxide ("$sCO_2$"). The power cycle working gas is pressurized to the desired working pressure and heated to the desired working temperature through the interface with a heat exchanger. In the case of the liquid, the liquid will undergo a liquid to gas phase transition. When the power cycle working gas reaches the steam turbine, the kinetic energy stored within the power cycle working gas provides the thermodynamic system to convert the heat energy into mechanical energy to generate electricity. The steam turbine then exhausts the heat which cannot be used to do work and is sent to a condensing tower and returned to the heat exchanger.

The problems to address and resolve that are associated with renewable energy plants and conventional energy plants regarding TES and conversion of the TES to electricity include those relating to the heating of the TSF, the transferring of the heat from the TES to the HTF, the pumping of the HTF to a heat exchanger, and the pumping of the HTF back to the TES.

The main problems are briefly summarized as follows:

The major disadvantages contributed to CSP, wind and photovoltaic energy production is that power output from renewable energy sources is dependent on a variety of factors that can affect the power output from these natural resources. Wind can only be produced when the wind is blowing, and photovoltaics are dependent on sunlight to effectively gather solar energy. Power is produced in an intermittent fashion for these technologies. Battery systems for wind and photovoltaics are generally manufactured from lithium and cobalt materials which are subject to supply risks and other vulnerabilities, and lithium-ion battery technology is directly associated with adverse environmental issues. In addition, lithium-ion batteries are generally not cost effective for grid-level energy storage because of the capital cost for the installation of the lithium-ion batteries.

The major disadvantage of molten salts (as an HTF) is their relatively high melting temperature which requires measures in order to maintain the salts above their melting temperatures. The density of molten salts is four times the density (or specific gravity) of water. Consequently, the structural loads on the containment vessel are very high and the energy required to pump molten salts is greater than that of pumping oil or water HTFs. The system components, such as containment vessel, heat exchanger, pumping equipment, piping, and valves will undergo repeated thermal expansion and contraction, and must be able to accommodate such extreme thermal cycling without any structural failures to these components. In addition to being able to hold large quantities of heat, MS can be corrosive. Therefore, the materials used for the containment vessel, heat exchanger, pumping equipment, piping, and valves must be resistant to sulfiding, carburizing, and oxidizing conditions at extremely high temperatures and offer enhanced services that do not require regular maintenance.

Following operational safety, operational reliability is a priority. A need exists for a TES system that has a high degree of operational reliability and consequently, a high degree of serviceability.

BRIEF SUMMARY OF THE INVENTION

The disclosed subject matter provides an energy recovery system including a thermal energy storage ("TES") vessel for storing and recovering electricity generated from at least one energy source. The system comprises the thermal energy storage vessel which converts electricity into an alternative thermal energy source. An electrical connection is established between at least one energy source and the thermal energy storage vessel in order to receive the electricity from that energy sources to the thermal energy storage vessel. Once the electricity is converted into an alternative energy source, such as heat, the heat (carried via a power cycle working gas) is transferred to a steam turbine where it is converted into rotational energy which is in turn converted into electrical energy via a generator. An energy exchange interface then returns the electricity to a grid via an energy exchange interface.

A TES vessel is provided for storing and recovering electricity generated from at least one energy source. The TES vessel comprises a vessel floor, a vessel roof, and a plurality of walls affixed to the vessel floor and the vessel roof. A first pipe header is affixed to at least one supply pipe while a second pipe header is affixed to at least one return pipe. Matching sets of supply pipes and return pipes may each be affixed to a tubing that may be coiled around an immersion heating element. The coiled tubing and immersion heating element combination are at least partially submerged in a thermal storage fluid contained within the vessel in order to transfer heat from a heating element to the thermal storage fluid. The coiled tubing acts as a heat exchanger that is located within the TES.

A method is provided for recovering electricity generated from at least one energy source. The method includes collecting electricity from the at least one energy source in a thermal energy storage vessel. The electricity is then converted to heat via at least one immersion heating element positioned within the thermal energy storage vessel at least partially submerged in a thermal storage fluid heated by the heat from the immersion heating element. In this method, the nitrate molten salt is the TSF and in the process will be the heat transfer fluid. A power cycle working gas is then passed through tubing associated with each of the immersion heating elements. When this occurs, the power cycle working gas is heated via the heat transferred from the thermal storage fluid. Once heated, the power cycle working gas is sent to a generator to convert the heated steam into usable electricity.

The immersion heating element and the associated power cycle working gas tubing are assembled as a unit which are all connected to the lifting flange that may exist as one contiguous and solitary component.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein:

FIG. 4A displays a cross-sectional view of a power cycle working gas return header and power cycle working gas supply pipe header in accordance with embodiments.

FIG. 4B displays a plan view of the power cycle working gas return pipe and power cycle working gas return header in accordance with embodiments.

FIG. 5A displays a schematic view of an immersion heating element and heater tubing in accordance with embodiments.

FIG. 6A displays a side view of a vertical turbine pump in accordance with embodiments.

FIG. 6B displays a top view of a vertical turbine pump in accordance with embodiments.

FIG. 7 displays a top view of a lifting flange and associated features in accordance with embodiments.

FIG. 9A displays a top view of a heat shield including baffle orifices in accordance with embodiments.

FIG. 9B displays a top view of a baffle including heat shield orifices in accordance with embodiments.

FIG. 9C displays a top view of a flange including flange orifices in accordance with embodiments.

FIG. 11 displays a method for recovering electricity generated from at least one energy source.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
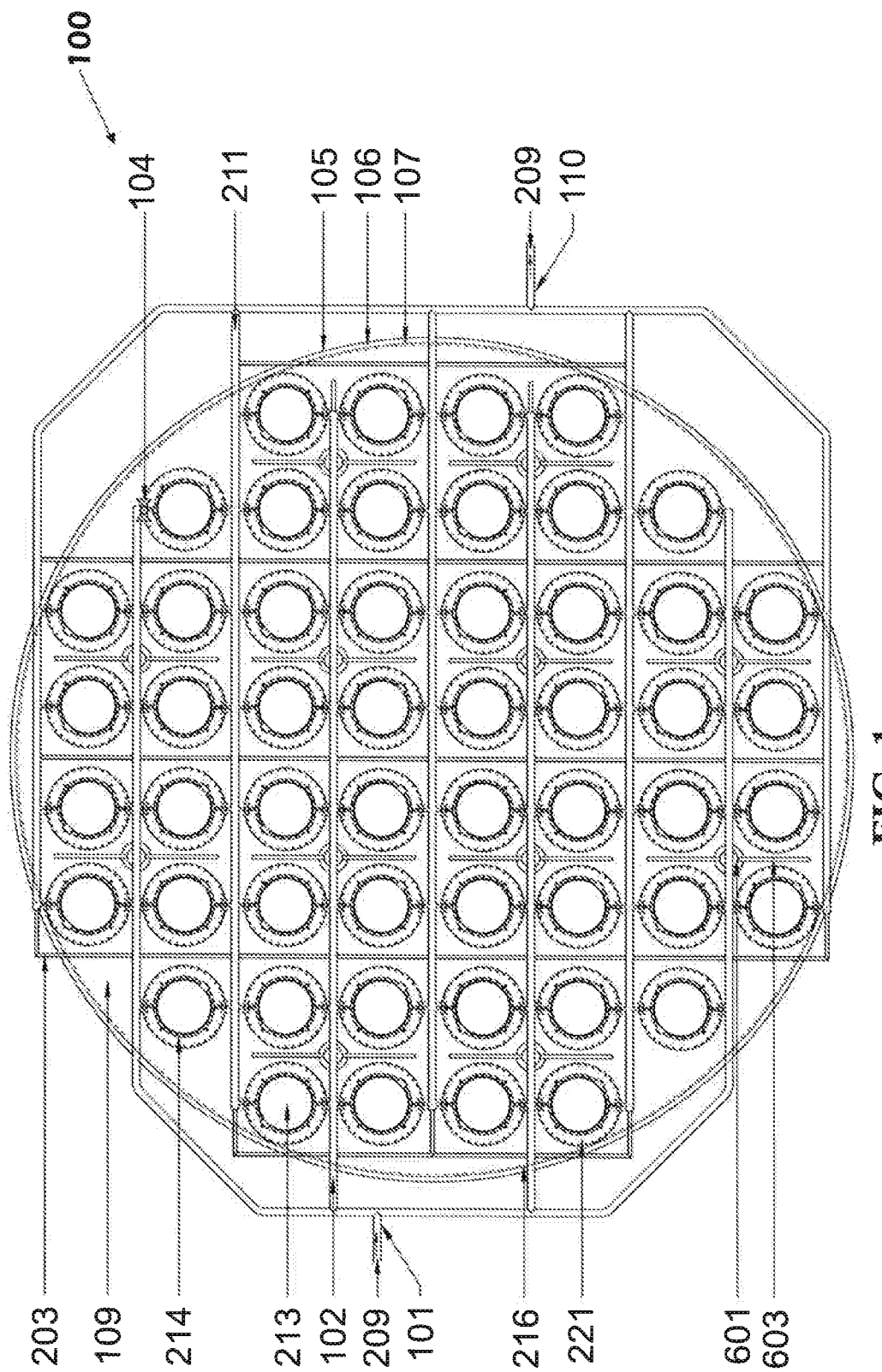
FIG. 1 displays a plan view of a thermal energy storage (TES) vessel in accordance with embodiments.

FIG. 1 displays a plan view of a thermal energy storage (TES) vessel 100. TES vessel 100 may comprise an outer vessel wall 105 and an inner vessel wall 107 with a thermal insulation layer 106 positioned between the outer vessel wall 105 and the inner vessel wall 107. At least one heating element 108 is positioned within the vessel 100, with each of the heating elements 108 surrounded by a power cycle working gas tubing 103. The heating elements 108 may be indirectly connected to sources of energy and may convert this energy from electricity to heat (since the heating element 108 acts as a resistor); the heat is then stored in a thermal storage fluid (TSF) 109. The power cycle working gas tubing 103 provides exposure of a power cycle working gas 209 (FIG. 2), or power cycle working gas (in this case, steam), to heat stored in the thermal storage fluid 109.

The thermal storage fluid 109 may be at least one of a eutectic ternary molten salt and a eutectic ternary nitrate molten salt. The molten salt may comprise at least one of $NaNO_3$, $Ca(NO_3)_2$ and $KNO_3$.

In order to heat the power cycle working gas 209, a gas return pipe 101 connected to a gas return pipe header 102 provides the power cycle working gas 209 to TES vessel 100. A series of valves 104 connected to a gas return pipe header 102 allows passage of the power cycle working gas 209 into TES vessel 100 where it travels through heat transfer fluid tubing 103, increasing in temperature as it travels through the power cycle working gas tubing 103. Once the power cycle working gas 209 has gathered heat, it exits TES vessel 100 through gas supply header 211 to a gas supply pipe 110 and is sent to steam turbine 1011 and generator 1014 and subsequently sent to the power grid as grid supply 1050.

The thickness between the outer vessel wall 105 and the inner vessel wall 107 may be 4 inches in thickness. In additional embodiments, the thermal insulation layer 106 may be 4 inches in thickness.

Figure 2:
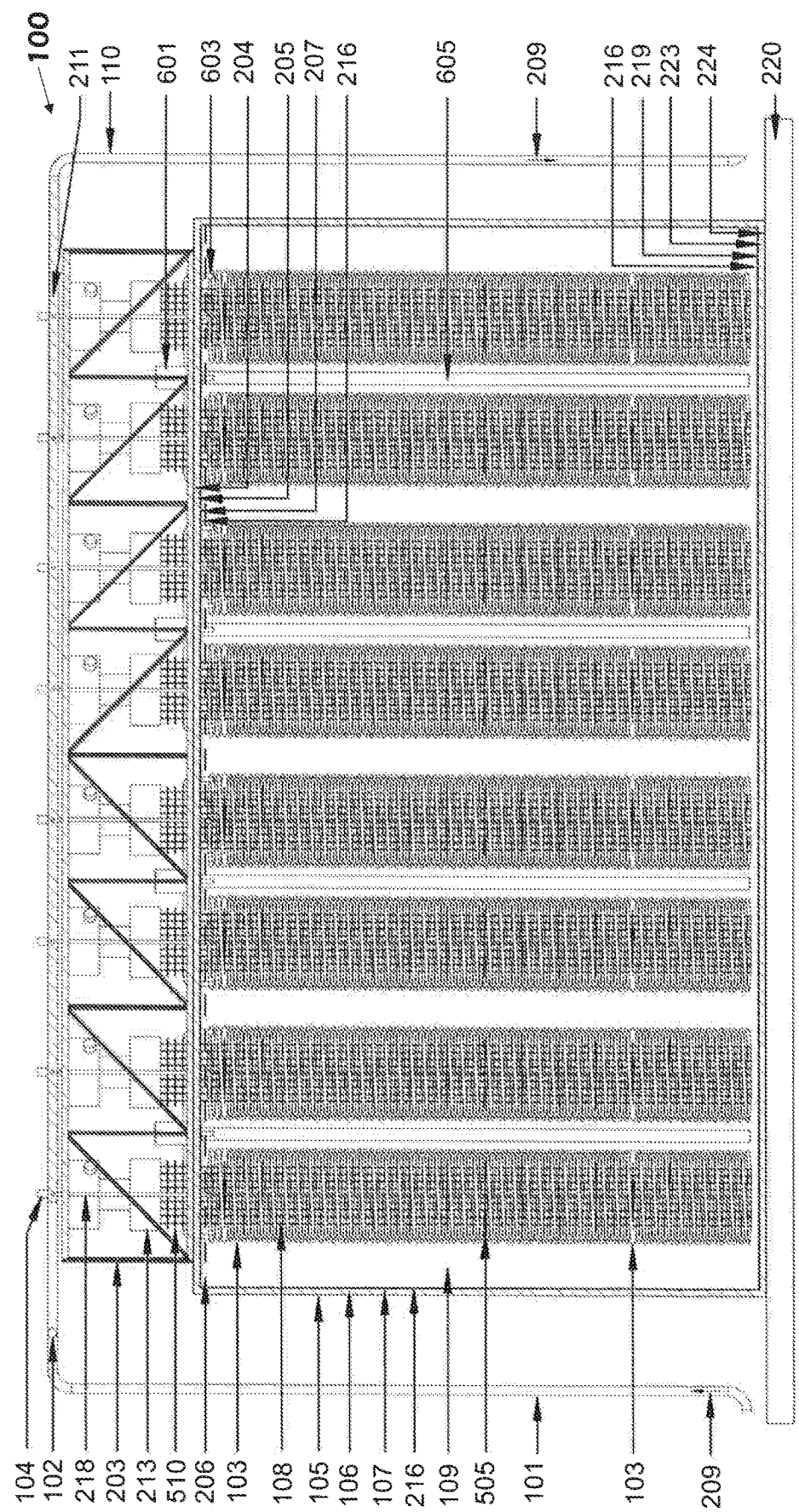
FIG. 2 displays a front elevational cross-sectional view of a thermal energy storage vessel and a portion of components of an energy recovery system in accordance with embodiments.

FIG. 2 displays a front elevational view of a thermal energy storage vessel 100 and a portion of components of an energy recovery system 1010. TES vessel 100 may include an outer wall 105, an inner wall 107, a roof 204, ceiling 207, floor 219, and foundation 220 (optionally made of concrete). The power cycle working gas tubing 103, gas return tubing 218, gas supply tubing 222 and heating elements 108 are integrated with the roof 204/ceiling 207 by the lifting flange 221 so that power cycle working gas tubing 103 and heating elements 108 are suspended from lifting flange 221 downwards into the chamber of TES vessel 100. Roof insulation layer 205, thermal insulation layers 106 and thermal insulation layers 223 are positioned between respective sections of TES vessel 100 in order to properly retain heat to the heat storage fluid 109 supplied by the heating elements 108. A ceramic layer 216 may be positioned adjacent to ceiling layer 207, wall layer 107, and floor layer 219 in order to provide additional insulation for TES vessel 100. The thermal insulation layer 106 may comprise ceramic or wool materials.

Power cycle working gas 209 may be pumped (see FIG. 2) into TES vessel 100 through gas return pipe 101 connected to gas return pipe header 102 and valves 104. Once the power cycle working gas 209 passes the valves 104, it enters gas return tubing 218 and passes into the bottom of power cycle working gas tubing 103, where it is heated. The heated power cycle working gas 209 then exits power cycle working gas tubing 103 and enters gas supply tubing 222, where it then travels out of valves 104 in gas supply pipe header 211 and ultimately back to steam turbine 1011 (see FIG. 10) through gas supply pipe 110. In embodiments, power cycle working gas tubing 103, gas return tubing 218, gas supply tubing 222, and lifting flange 221 may exist as one contiguous, solitary component. In order for TES vessel 100 to provide optimal heat storage and transfer, TES vessel 100 may be filled with thermal storage fluid 109 to the thermal storage fluid fill level 206. Based on the parameters of the heat transfer process, the height of the thermal storage fluid fill level 206 may vary.

It is noted that the term "return" in the element gas return pipe header 102 may refer to the power cycle working gas 209 being "returned" to TES vessel 100, while the term "supply" in the element gas supply pipe header 211 may refer to the power cycle working gas 209 being "supplied" to steam turbine 1011.

One or more heating elements 108 and the associated power cycle working gas tubing 103 are assembled as a unit which are all connected to the lifting flange 221 that may exist as one contiguous and solitary component which are designed to be easily removable from TES vessel 100 so that TES vessel 100 may continue to store heat without the full capacity of heating elements 108 being utilized. Heating elements 108 may be affixed to the ceiling 207/roof 204 via lifting flange 221, which utilize lifting flange bolts 701 (see FIG. 7) affixed to roof 204 to keep the heating elements 108 in place. Once bolts 701 are removed, heating element 108 and power cycle working gas tubing 103 are lifted out of TES vessel 100 without the need for TES vessel 100 to be shut down, meaning that there is no operational down time for vessel 100. In order to efficiently hold the weight of heating element 108, TES vessel 100 may utilize roof trusses 203 (positioned on roof 204) as reinforcement. The compact configuration of the heating element 108 and power cycle working gas tubing 103 may allow for easy extraction out of roof 204. In embodiments, weather head 213 may house the electrical components associated with heating elements 108 and may include, but is not limited to induction heater components and thermostats.

Figure 3:
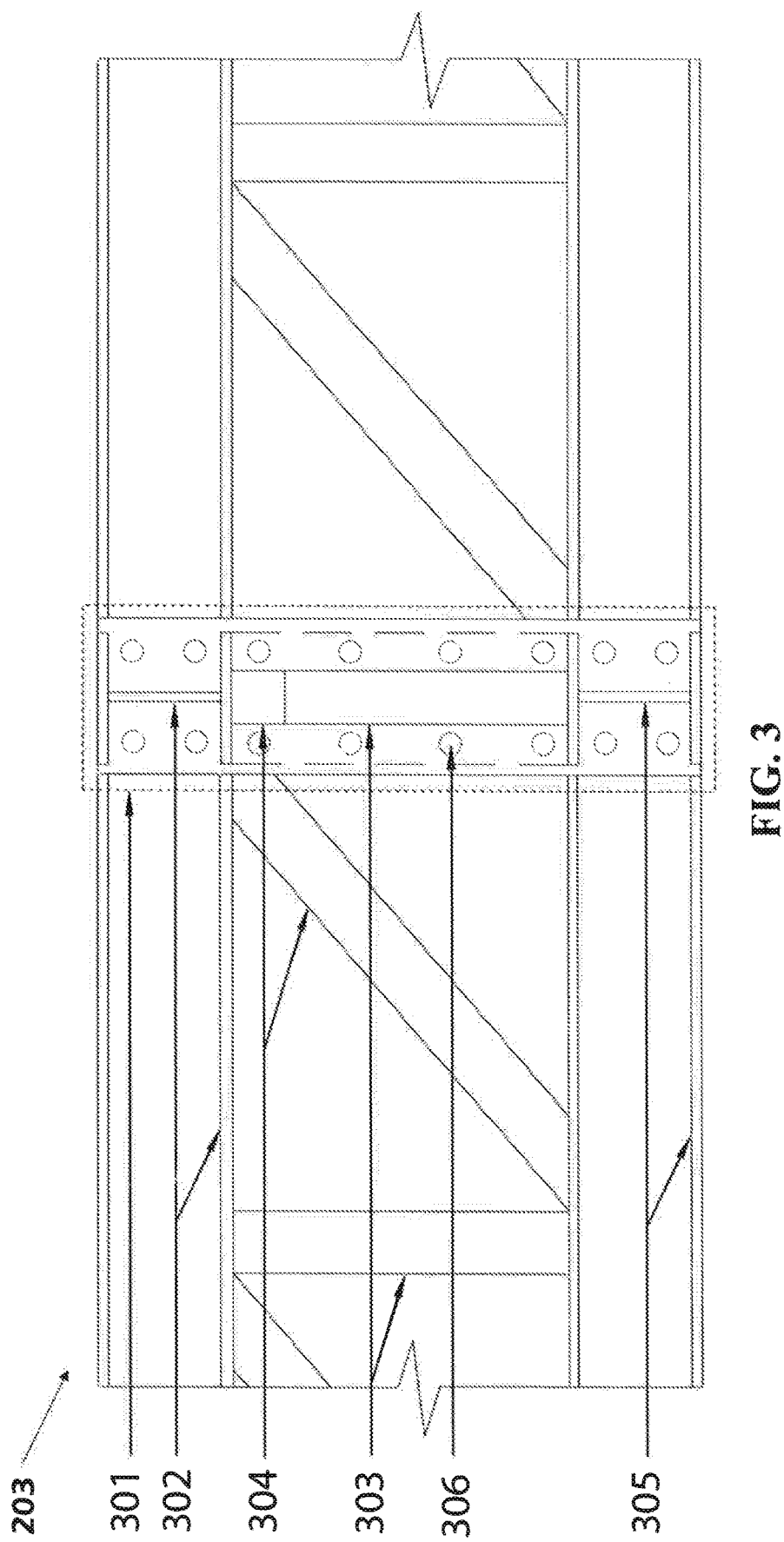
FIG. 3 displays a sectional view of roof trusses of a thermal energy storage vessel in accordance with embodiments.

FIG. 3 displays a sectional view of roof trusses 203 of a TES vessel 100. Each roof truss 203 may comprise top I-beam truss cord 302, a plurality of vertical and diagonal truss members 303, 304, and bottom I-beam truss cord 305. Roof trusses 203 may be positioned above roof 204 and may assist in reinforcing TES vessel 100 so that it can support the weight of the heating elements 108 and associated components. A secondary steel truss 301 may connect adjacent roof trusses 203 in a perpendicular manner above TES vessel 100 (spanning the width of TES vessel 100) in order to provide additional reinforcement. In embodiments, roof trusses 203 may comprise steel.

FIG. 4A displays a cross-sectional view of a power cycle working gas return pipe header 102 and power cycle working gas supply header 211. As shown, valves 104 may be connected to power cycle working gas return pipe header 102 and to power cycle working gas supply pipe 211 via valve flange 403 that are connected with valve flange bolts 404. Power cycle working gas return tubing 218 and power cycle working gas supply tubing 222 are connected to the valve at the valve flange 403. Power cycle working gas 209 may pass through these elements when returning from steam turbine 1011 via power cycle working gas return pipe 101 (FIG. 10); a compressor (for example, a rotary screw compressors) may need to be affixed to gas return pipe 101 in order to return power cycle working gas 209 to power cycle working gas return pipe header 102 (since power cycle working gas return pipe header 102 is located a certain distance above the ground).

Figure 10:
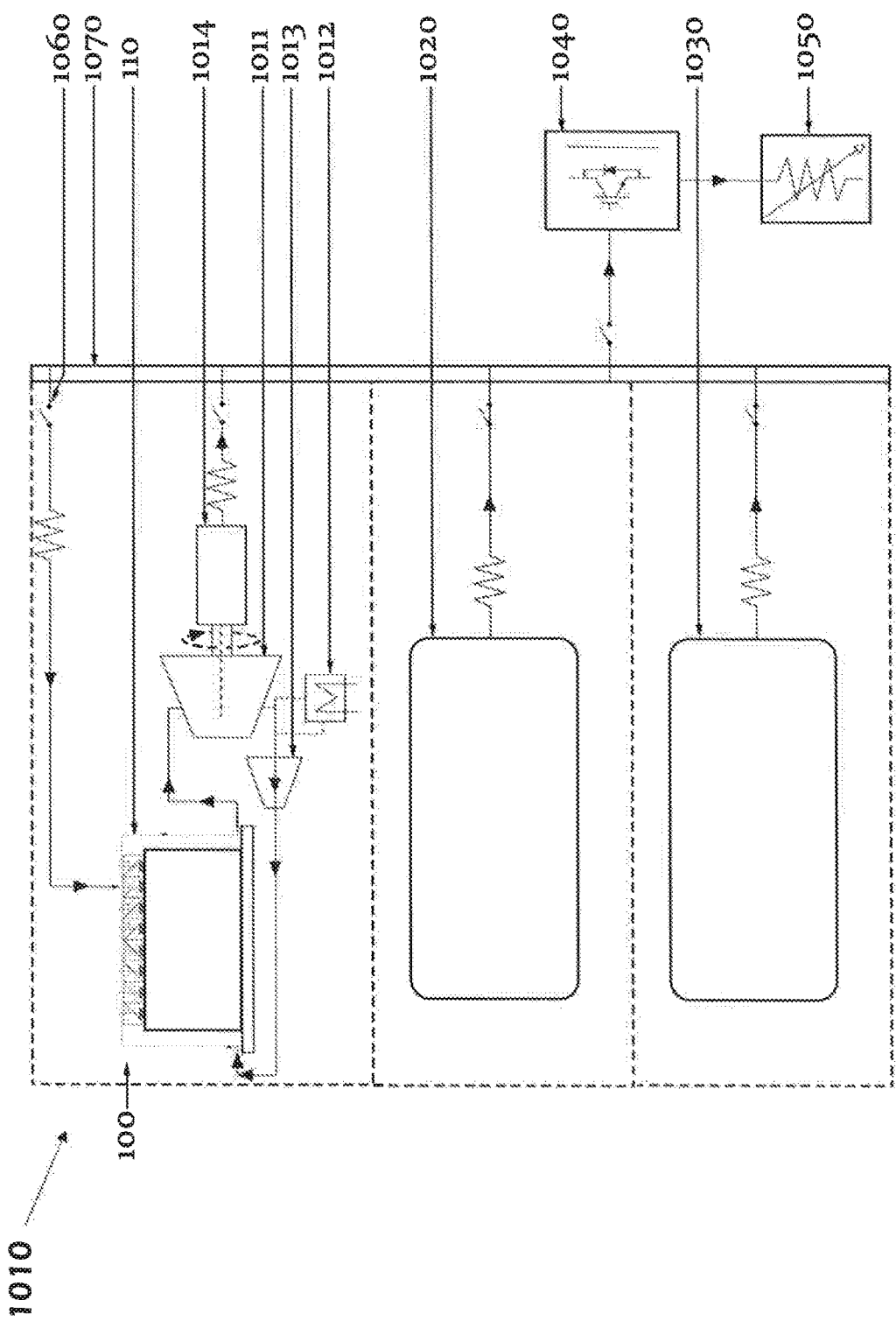
FIG. 10 displays a block diagram of an energy recovery system interfaced with renewable energy and conventional energy producers in accordance with embodiments.

FIG. 4B displays a plan view of a power cycle working gas return pipe header 102. As shown, a plurality valves 104 may be connected to power cycle working gas return pipe header 102. The power cycle working gas return tubing 218 is connected to the valve at the valve flange 403. Power cycle working gas 209 may pass through these elements when returning from steam turbine 1011 via power cycle working gas return pipe 101 (FIG. 10).

Figure 4C:
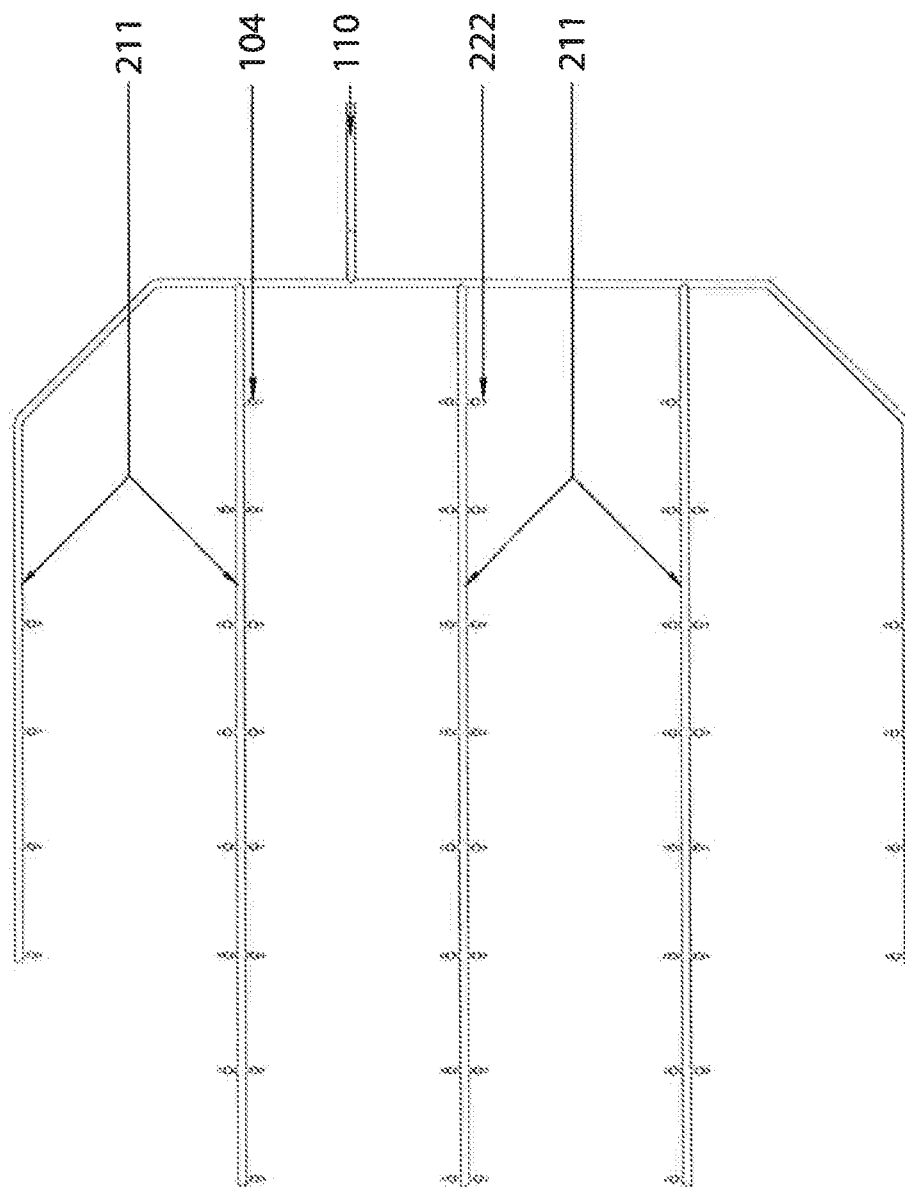
FIG. 4C displays a plan view of the power cycle working gas supply header in accordance with embodiments.

FIG. 4C displays a plan view of a power cycle working gas supply pipe header 211. As shown, a plurality valves 104 may be connected to power cycle working gas supply pipe header 211. The power cycle working gas supply tubing 222 is connected to the valve at the valve flange 403. Power cycle working gas 209 may pass through these elements when returning from steam turbine 1011 via power cycle working gas return pipe 101 (FIG. 10)

FIG. 5A displays a schematic view of a heating element 108 and power cycle working gas tubing 103. In this configuration, power cycle working gas tubing 103 is "coiled" around heating element 108, which allow the power cycle working gas tubing 103 to be exposed to the heated thermal storage fluid 109, allowing for the power cycle working gas 209 to absorb and retain an extensive amount of heat. It is noted that this configuration allows the power cycle working gas tubing 103 to be positioned adjacent to the heating element 108 without coming in direct contact with heating element 108 (except where power cycle working gas return tubing 218 and power cycle working gas supply tubing 222 pass through lifting plate 221. Flange 214 may be positioned/bolted on a top surface of lifting plate 221 and may provide additional reinforcement for holding the weight of heating element 108 and power cycle working gas tubing 103 as well as protection for weather head 213 and related components. Lifting rings 215 may also be positioned on the top surface of lifting plate 221 and may assist with the efficient removal of heating element 108 and power cycle working gas tubing 103 out of TES vessel 100.

In embodiments, heating element 108/power cycle working gas tubing 103 may comprise more than one of each of power cycle working gas return tubing 218 and power cycle working gas supply tubing 222. Each of the more than one of power cycle working gas return tubing 218 and power cycle working gas supply tubing 222 may be connected to valve 104 at valve flange 403.

It is noted that, in embodiments, the distance between the surface of lifting plate 221 closest to weather head 213 (top surface) and the bottom of weather head 213 may be 20 inches. In further embodiments, the distance between the top of weather head 213 to the bottom of heating element 108 may be 460.63 inches.

Figure 5B:
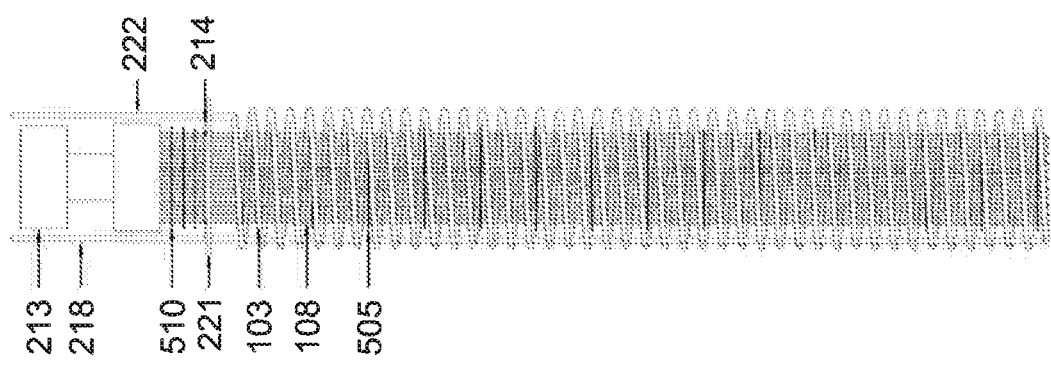
FIG. 5B displays a schematic view of an alternative embodiment of a heating element and power cycle working gas tubing in accordance with embodiments.

FIG. 5B displays a schematic view of an alternative embodiment of a heating element 108 and power cycle working gas tubing 103. The embodiment of heating element 108 and power cycle working gas tubing 103 in FIG. 5B may comprise similar components found in the embodiment of heating element 108 and power cycle working gas tubing 103 found in FIG. 5A that may include, but is not limited to power cycle working gas tubing 103, heating element 108, weather head 213, power cycle working gas return tubing 218, lifting plate 221, and power cycle working gas supply tubing 222. In addition, heat shields 510 may be positioned between weather head 213 and lifting plate 221 in order to protect weather head 213 and its components from high temperatures. In embodiments, heating element 108 may comprise three heat shields 510 that may be positioned and distanced evenly between weather head 213 and flange 214 (as an example, 4.5 inches between each heat shield 510, 4.5 inches from weather head 213 to adjacent heat shield 510, and 4.5 inches from flange 214 to adjacent heat shield 510).

Figure 5C:
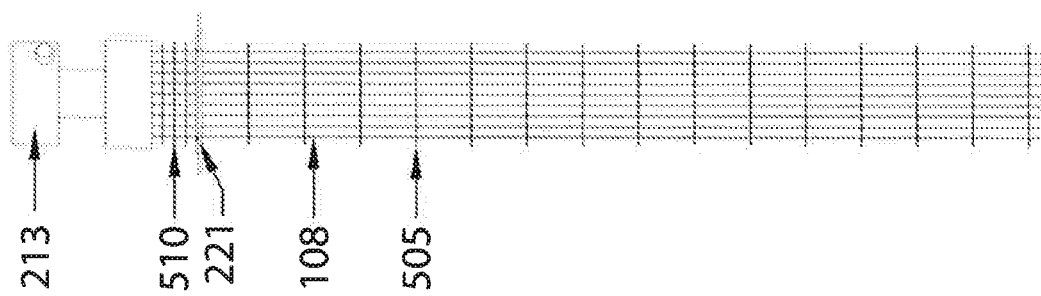
FIG. 5C displays a schematic view of an alternative embodiment of a heating element without a power cycle working gas tubing in accordance with embodiments.

FIG. 5C displays a schematic view of an alternative embodiment of a heating element 108 without a power cycle working gas tubing 103. The embodiment of heating element 108 and power cycle working gas tubing 103 in FIG. 5C may comprise similar components found in the embodiment of heating element 108 and power cycle working gas tubing 103 found in FIG. 5A that may include, but is not limited to heating element 108, weather head 213, lifting plate 221, and heat shield 510 (FIG. 5B). In addition, baffles 505 may be positioned along the length of the heating portions of heating element 108 in order to keep the heating portions of heating element 108 organized and stabilized. It is noted that, in embodiments, the distance between lifting plate 221 and adjacent baffle 505 may be 20 inches and the distance between adjacent baffles 505 may be 24 inches.

FIG. 6A displays a side view of a vertical turbine pump 601. As shown, vertical turbine pump 601 may include distribution piping 603, flange 604, and pump column and shaft assembly 605. The distribution piping 603 may be encased with a layer of aluminum jacketing 602. A thermal insulation layer 106 may be between the distribution piping 603 and the aluminum jacketing layer 602.

FIG. 6B, displays a plan view of a vertical turbine pump 601. As shown, vertical turbine pump 601 may include distribution piping 603, and flange 604.

FIG. 7A displays a top view of a lifting plate 221 of a heating element 108, power cycle working gas tubing 103 and associated features. Lifting plate 221 is affixed to roof 204 via a plurality of lifting plate bolts 701. Flange 214 is positioned on top of lifting plate 221 and is affixed via flange bolts 704. Power cycle working gas return tubing 218 and power cycle working gas supply tubing 222 extend through opposite sides of lifting plate 221 via orifices (referred to as gas return pipe orifice 709 and gas supply pipe orifice 710) so that power cycle working gas tubing 103 and heating element 108 may be positioned/moved as a single unit. Weather head 213 may be positioned at the center of lifting plate 221 and flange 214 and may align with heating element 108. Lifting rings 215 may be affixed to lifting plate 221 via corresponding base plates 706 and may be positioned adjacent the circumference of lifting plate 221/flange 214. As shown, the lifting rings 215 and base plates 706 are positioned roughly 90 degrees apart so that heating element 108 and power cycle working gas tubing 103 is removed efficiently and easily (using equipment such as a crane) when heating element 108 and power cycle working gas tubing 103 is removed from TES vessel 100. In embodiments, each of the power cycle working gas return pipe orifice 709 and gas supply pipe orifice 710 may comprise a diameter of 2.3 inches, the distance (latitudinally) between the midpoint of lifting plate 221 and the midpoint of gas return pipe orifice 709 (and also between the midpoint of lifting plate 221 and the midpoint of gas supply pipe orifice 710) may be 32 inches, the thickness of lifting plate 221 may be 1.5 inches, and/or the distance (in degrees) between adjacent lifting plate bolts 701 may be 10.59 degrees. FIG. 8A displays a partial cross-sectional view of a power cycle working gas tubing 103. Power cycle working gas tubing 103 is shown positioned adjacent and outside the bounds of power cycle working gas return tubing 218 and power cycle working gas supply tubing 222. This embodiment of having the power cycle working gas tubing 103, power cycle working gas return tubing 218, and power cycle working gas supply tubing 222 directly adjacent one another may provide efficiency in the manufacturing of the power cycle working gas tubing 103, power cycle working gas return tubing 218, and power cycle working gas supply tubing 222. In embodiments, the distance between the center point of the circumference of power cycle working gas tubing 103 and the center point of the circumference of power cycle working gas return tubing 218 (and gas supply tubing 222) may be 26.375 inches in length, the inner diameter of power cycle working gas return tubing 218 and gas supply tubing 222 may be 2 inches, the outer diameter of gas return tubing 218 and power cycle working gas supply tubing 222 may be 2.25 inches, and the distance between the center point of the circumference of power cycle working gas tubing 103 and the midpoint of the width of the actual tubing of power cycle working gas tubing 103 may be 58 inches.

Figure 8B:
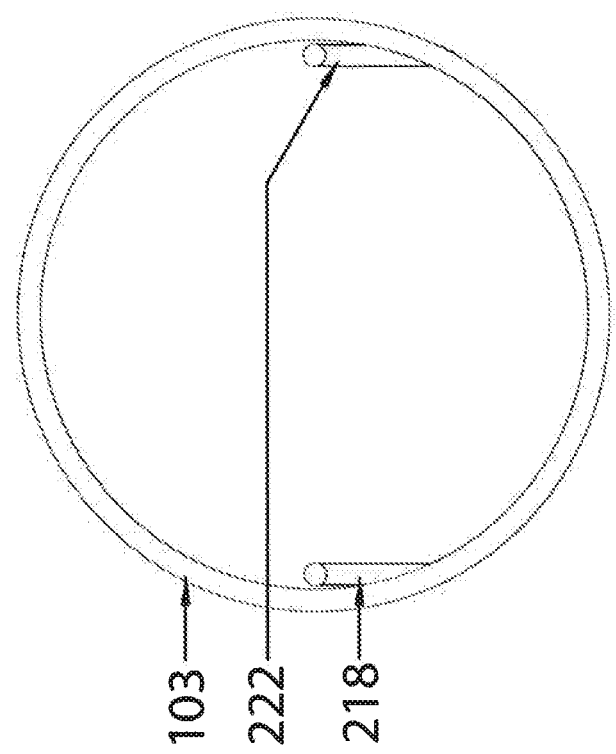
FIG. 8B displays a top view of power cycle working gas tubing in accordance with embodiments.
Figure 8A:
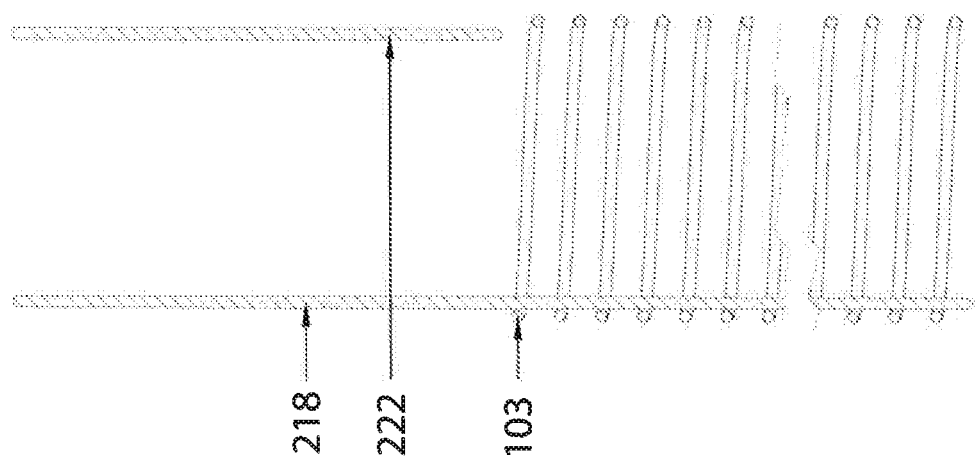
FIG. 8A displays a partial cross-sectional view of a heating element and power cycle working gas tubing in accordance with embodiments.

FIG. 8B displays a top view of the power cycle working gas tubing 103. Power cycle working gas tubing 103 is shown outside the bounds positioned adjacent and outside the bounds of power cycle working gas return tubing 218 and power cycle working gas supply tubing 222. This embodiment of having the power cycle working gas tubing 103, power cycle working gas return tubing 218, and power cycle working gas supply tubing 222 directly adjacent one another may provide efficiency in the manufacturing of the power cycle working gas tubing 103, power cycle working gas return tubing 218, and power cycle working gas supply tubing 222. In embodiments, the distance between the centerpoint of the circumference of power cycle working gas tubing 103 and the centerpoint of the circumference of power cycle working gas return tubing 218 (and gas supply tubing 222) may be 26.375 inches in length, the inner diameter of power cycle working gas return tubing 218 and gas supply tubing 222 may be 2 inches, the outer diameter of gas return tubing 218 and power cycle working gas supply tubing 222 may be 2.25 inches, and/or the distance between the centerpoint of the circumference of power cycle working gas tubing 103 and the midpoint of the width of the actual tubing of power cycle working gas tubing 103 may be 58 inches.

FIG. 9A displays a top view of a heat shield 510 including heat shield orifices 910. heat shield 510, as shown, includes 41 heat shield orifices 910 that may keep separate heating portions of heating element 108 organized and stabilized and to protect mechanical equipment associated with heating element/weather head 213. In embodiments, the distance (longitudinally) between the midpoints of heat shield orifices 910 in adjacent rows may be 4.56 inches, the distance between the midpoints of heat shield orifices 910 in a pair may be 1.8225 inches, the distance (latitudinally) between the midpoints of first heat shield orifices 910 (in a pair) in adjacent pairs may be 7.29 inches, the distance (latitudinally) between the midpoints of second heat shield orifices 910 (in a pair) in adjacent pairs may be 7.29 inches, the diameter of each heat shield orifice 910 may be 0.65 inches, the diameter of heat shield 510 may be 44 inches, and/or the thickness of heatshield 510 may be 0.25 inches.

FIG. 9B displays a top view of a baffle 505 including baffle orifices 905. Baffle 505, as shown, includes 41 baffle orifices 905 that may keep separate heating portions of heating element 108 organized and stabilized and to protect mechanical equipment associated with heating element/weather head 213. In embodiments, the distance (longitudinally) between the midpoints of baffle orifices 905 in adjacent rows may be 4.56 inches, the distance between the midpoints of baffle orifices 905 in a pair may be 1.8225 inches, the distance (latitudinally) between the midpoints of first baffle orifices 905 (in a pair) in adjacent pairs may be 7.29 inches, the distance (latitudinally) between the midpoints of second baffle orifices 905 (in a pair) in adjacent pairs may be 7.29 inches, the diameter of each baffle orifice 905 may be 0.65 inches, the diameter of baffle 505 may be 44 inches, and/or the thickness of baffle 505 may be 0.50 inches.

FIG. 9C displays a top view of a flange 214 including flange orifices 915. Flange 214, as shown, includes 41 flange orifices 915 that may keep separate heating portions of heating element 108 organized and stabilized and to protect mechanical equipment associated with heating element/weather head 213. In embodiments, the distance (longitudinally) between the midpoints of flange orifices 915 in adjacent rows may be 4.56 inches, the distance between the midpoints of flange orifices 915 in a pair may be 1.82 inches, the distance (latitudinally) between the midpoints of first flange orifices 915 (in a pair) in adjacent pairs may be 7.29 inches, the distance (latitudinally) between the midpoints of second flange orifices 915 (in a pair) in adjacent pairs may be 7.29 inches, the diameter of each flange bolt orifice 920 may be 0.875 inches, the diameter of flange 214 may be 50 inches, the distance from the midpoint of a flange bolt orifice 920 to its antipodal midpoint may be 48 inches, the distance (in degrees) between adjacent flange bolt orifice 920 midpoints may be 14.4 degrees, and/or the thickness of flange 214 may be 1 inch.

FIG. 10 displays a block diagram of an energy recovery system 1010 interfaced with renewable energy producers. TES vessel 100 may be electrically connected to a breaker 1060 and an energy exchange interface 1070 (for example, a DC bus), which may electrically connect TES vessel 100 to a plurality of renewable energy producers such as, but not limited to renewable power system 1020. Once TES vessel 100 receives electricity, it is converted into heat via heating elements 108 and transferred to a power cycle working gas 209 (for example, steam) sent through power cycle working gas tubing 103 surrounding the heating elements 108. It is noted that the heat from the heating elements 108 is transferred to a thermal storage fluid 109 for storage until the heat is absorbed by the power cycle working gas 209. Power cycle working gas 209 may then be sent to turbine 1011 (which in this case is a steam turbine) where the steam is converted into rotational energy, which is then converted into electricity via generator 1014. Generator 1014, electrically connected to energy exchange interface 1070, sends the electricity to energy exchange interface 1070, where it may be sent to PMW (pulse width modulation) inverter 1040 and subsequently to grid supply 1050. Condenser 1012 and compressor 1013 may be utilized to collect the steam processed in turbine 1011 so that it may be utilized again by the TES vessel 100/energy recovery system 1010.

Renewable energy systems 1020 may convert electricity to the proper voltage, the electricity may be sent to energy exchange interface 1070 and subsequently sent to either one of TES vessel 100 or to a PMW inverter 1040 and then to grid supply 1050.

Conventional energy system 1030 may convert a fuel source into electricity, and is electrically connected to energy exchange interface 1070, sends the electricity to energy exchange interface 1070, where it may be sent to PMW inverter 1040 and subsequently sent to either one of TES vessel 100 or to a PMW inverter 1050 and then to grid supply 1050.

It is noted that breakers 1060 may be positioned within the electrical connections between energy exchange interface 1070 and TES vessel 100, generator 1014 of TES vessel 100 and energy exchange interface 1070, renewable energy systems 1020, conventional energy systems and energy exchange interface 1070, and PMW inverter 1040.

The renewable energy sources may include, but are not limited to solar energy, wind energy, biomass, hydropower, and geothermal energy. For example, renewable energy sources 1020 are represented in FIG. 10. Conventional energy sources 1030 may include, but not limited to coal, natural gas, and petroleum fuels. For example, conventional energy sources are represented in FIG. 10.

FIG. 11 displays a method 1100 for recovering electricity generated from at least one energy source. Method 1100 may include collecting 1110 electricity from at least one energy source in a thermal energy storage vessel 100. The electricity may then be converted 1120 to heat via at least one heating element 108 positioned within the thermal energy storage vessel 100 and at least partially submerged in a thermal storage fluid 109 heated by the heat. Power cycle working gas 209 is then passed 1030 through tubing 103 adjacent each of the heating elements 108, which heats 1040 the power cycle working gas 209 via the heated thermal storage fluid 109 contained within thermal energy storage vessel 100. The heated power cycle working gas 209 may then be sent 1050 to generator 1014 to convert 1060 the heated steam into usable electricity. Utilizing method 1100, usable electricity may be provided on demand and may be sent 1170 to a power grid.

The power cycle working gas 209 may be sent through the thermal energy storage vessel 100 when the thermal energy storage vessel 100 is utilizing less than fun capacity of the at least one heating element 108.

It is noted that the at least one energy source utilized in method 1100 may comprise solar energy, wind energy, biomass, hydropower, geothermal energy, and conventional energy sources.

Various attachment and fitting techniques and equipment (male-female engagement, fastening means, adhesives) may be utilized in any of the disclosed embodiments in order for components of the embodiments to efficiently and/or properly attach to one another and so that TES vessel 100/TES Power Storage System 1010 can efficiently and/or properly function. For example, lifting plate 221 may be affixed to vessel roof 204 via a bolt (male engagement element) and threading (female engagement element) found in vessel roof 204 which may provide security and stability to lifting plate 221 and TES vessel 100 but may also allow lifting plate 221 to be easily removable from TES vessel 100.

For the purposes of this disclosure, the terms "thermal storage fluid 109" ("TSF"), "thermal energy fluid" ("TEF") and "heat storage fluid" ("HSF") may be synonymous.

For the purposes of this disclosure, the terms "power cycle working gas" and "gas 209" are synonymous.

For the purposes of this disclosure, the terms "power cycle working gas tubing 103", "tubing", "helical tubing", and "coiled tubing" are synonymous.

For the purposes of this disclosure, the term "power cycle working gas tubing 103" may collectively refer to elements "power cycle working gas tubing 103", "gas return pipe 101", and "gas supply pipe 110."

For the purposes of this disclosure, the terms tube/tubing and pipe/piping may be used interchangeably.

In embodiments, the term "heating element 108" may refer to one heating element 108 or may refer to more than one heating element 108.

In embodiments, thermal storage fluid 109 may comprise at least one of molten salt, solid silicon, molten silicon, molten aluminum, concrete, rock or other such materials that demonstrate to be a heat transfer fluid that can act as thermal storage media with optimal economics or operational characteristics.

It is noted that TES system 100, once it receives electricity from at least one of renewable energy systems 1020 (energy sources), TES system 100 stores the energy and returns approximately 75% or more of the energy in the form of usable electricity dispatchable to the grid, on demand.

It is noted that power cycle working gas 209 returned to TES vessel 100 via gas return pipe 101 may be superheated steam with a temperature of around 280 degrees Celsius and power cycle working gas 209 sent to turbine 1011 via gas supply pipe 110 may be supercritical steam with a temperature of around 550 degrees Celsius.

It is noted that the terms "gas return pipe 101" and "gas supply pipe 110" may alternatively be referred to as "fluid return pipe" and "fluid supply pipe."

In embodiments, power cycle working gas 209 may be a state of matter other than a gas.

It is noted that in embodiments, heating element 108 may refer to the combination of multiple heating portions (typically referred to as heating elements in the art). In addition, heating element 108 may collectively refer to all of the components found in a heater.

It is noted that in embodiments, heating portions of heating elements 108 (the portions that heat up) may comprise the shape of an elongated "U" so that a single portion may fit into a pair of baffle orifices 905, heat shield orifices 910, and flange orifices 915.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. A thermal energy storage vessel for storing and recovering electricity generated from at least one energy source, comprising:
    a vessel floor;
    a vessel roof;
    a plurality of walls affixed to the vessel floor and the vessel roof;
    a first pipe header affixed to at least one supply pipe;
    a second pipe header affixed to at least one return pipe;
    a truss construction positioned on the vessel roof; and
    at least one vertically-installable unit at least partially supported by the truss construction, each of the at least one vertically-installable unit comprising a heating element and a tubing, each of the at least one tubing affixed to a respective one of the at least one supply pipe and to a respective one of each of the at least one return pipe;
    wherein each of the at least one vertically-installable unit are at least partially submerged in a thermal storage fluid contained within the vessel.

2. The thermal energy storage vessel of claim 1, wherein each of the at least one vertically-installable unit is removably engageable with the vessel.

3. The thermal energy storage vessel of claim 1, wherein each of the at least one vertically-installable unit is removably engageable with the vessel via a lifting plate engaging the vessel roof, further wherein the thermal energy storage vessel is configured for continuous operation during removal and absence of one or more of the at least one vertically-installable unit.

4. The thermal energy storage vessel of claim 3, wherein each of the at least one vertically-installable unit and the at least one lifting plate are assembled together as a solitary unit.

5. The thermal energy storage vessel of claim 1, wherein heat stored in the thermal storage fluid is transferred to a power cycle working gas travelling in the at least one tubing that is in communication with the thermal storage fluid.

6. The thermal energy storage vessel of claim 1, further comprising at least one vertical turbine primp at least partially submerged in the thermal storage fluid and affixed to the vessel roof, each of the at least one vertical turbine pump positioned adjacent at least one of the at least one vertically-installable unit.

7. The thermal energy storage vessel of claim 1, wherein each of the at least one tubing is coiled around, a respective one of each of the at least one heating element.

8. The thermal energy storage vessel of claim 1, wherein the at least one energy source comprises at least one of solar energy, wind energy, biomass, hydropower, geothermal energy, or at least one conventional energy source.

9. A method for recovering electricity generated from at least one energy source, comprising:
    providing a thermal energy storage vessel, the thermal energy storage vessel including:
        a vessel floor;
        a vessel roof;
        a plurality of walls affixed to the vessel floor and the vessel roof;
        a first pipe header affixed to at least one supply pipe;
        a second pipe header affixed to at least one return pipe;
        a truss construction positioned on the vessel roof; and
        at least one vertically-installable unit at least partially supported by the truss construction, each of the at least one vertically-installable unit comprising a heating element and a tubing, each of the at least one tubing affixed to a respective one of the at least one supply pipe and to a respective one of the at least one return pipe;
    collecting electricity from the at least one energy source in the thermal energy storage vessel;
    converting the electricity to heat via the heating element of each of the at least one vertically-installable unit positioned within the thermal energy storage vessel, the at least one vertically-installable unit at least partially submerged in a thermal storage fluid contained within the vessel and heated by the heat;
    passing power cycle working gas through the tubing of each of the at least one vertically-installable unit;
    heating the power cycle working gas via the thermal storage fluid; and
    sending the heated power cycle working gas to a turbine to convert the heated steam, into rotational energy, wherein a generator converts the rotational energy into usable electricity.

10. The method of claim 9, further comprising providing the usable electricity on demand.

11. The method of claim 9, further comprising sending the usable electricity to a power grid or for self-generation or partial recharging of the thermal storage fluid.

12. The method of claim 9, wherein the power cycle working gas is sent through the thermal energy storage vessel when the thermal energy storage vessel is utilizing less than full capacity of the at least one vertically-installable unit.

13. The method of claim 9, wherein each of the at least one energy source comprises solar energy, wind energy, biomass, hydropower, geothermal energy, or conventional energy.

14. An energy recovery system for storing and recovering electricity generated from at least one energy source, comprising:
- a thermal energy storage vessel, wherein the thermal energy storage vessel converts electricity into an alternative energy source via at least one vertically-installable unit and a thermal storage fluid, the thermal energy storage vessel including:
  - a vessel floor;
  - a vessel roof;
  - a plurality of walls affixed to the vessel floor and the vessel roof;
  - a first pipe header affixed to at least one supply pipe;
  - a second pipe header affixed to at least one return pipe;
  - a truss construction positioned on the vessel roof; and
  - at least one vertically-installable unit at least partially supported by the truss construction, each of the at least one vertically-installable unit comprising a heating element and a tubing, each of the at least one tubing affixed to a respective one of the at least one supply pipe and to a respective one of the at least one return pipe;
  - wherein each of the at least one vertically-installable unit are at least partially submerged in a thermal storage fluid contained within the vessel;
- an electrical connection for sending the electricity from the at least one energy source to the thermal energy storage vessel;
- a turbine operatively connected to the thermal energy storage vessel;
- a generator operatively connected to the turbine; and
- an energy exchange interface electrically connected to the thermal energy storage vessel, the generator, and a grid;
- wherein the thermal energy storage vessel provides the alternative energy source to the turbine and subsequently the generator to convert the alternative energy source into electricity to send to the grid or for self-generation or partial recharging of the thermal storage fluid.

15. The energy recovery system of claim 14, wherein the thermal energy storage vessel provides the alternative energy source to the turbine in the form of a power cycle working gas.

16. The energy recovery system of claim 15, wherein the power cycle working gas is sent through the thermal energy storage vessel when the thermal energy storage vessel is utilizing less than full capacity of the at least one vertically-installable unit.

17. The energy recovery system of claim 14, wherein the alternative energy source is stored in the form of heat when stored in the thermal energy storage vessel.

18. The energy recovery system of claim 17, wherein the alternative energy source is stored in the thermal storage fluid contained within the thermal energy storage vessel.

19. The energy recovery system of claim 14, wherein at least a portion of the alternative energy is provided as electricity to the grid or for self-generation.

20. The energy recovery system of claim 14, wherein the alternative energy is provided on demand.

* * * * *